3,392,749
PRESSURE REGULATOR WITH BALANCING PISTON

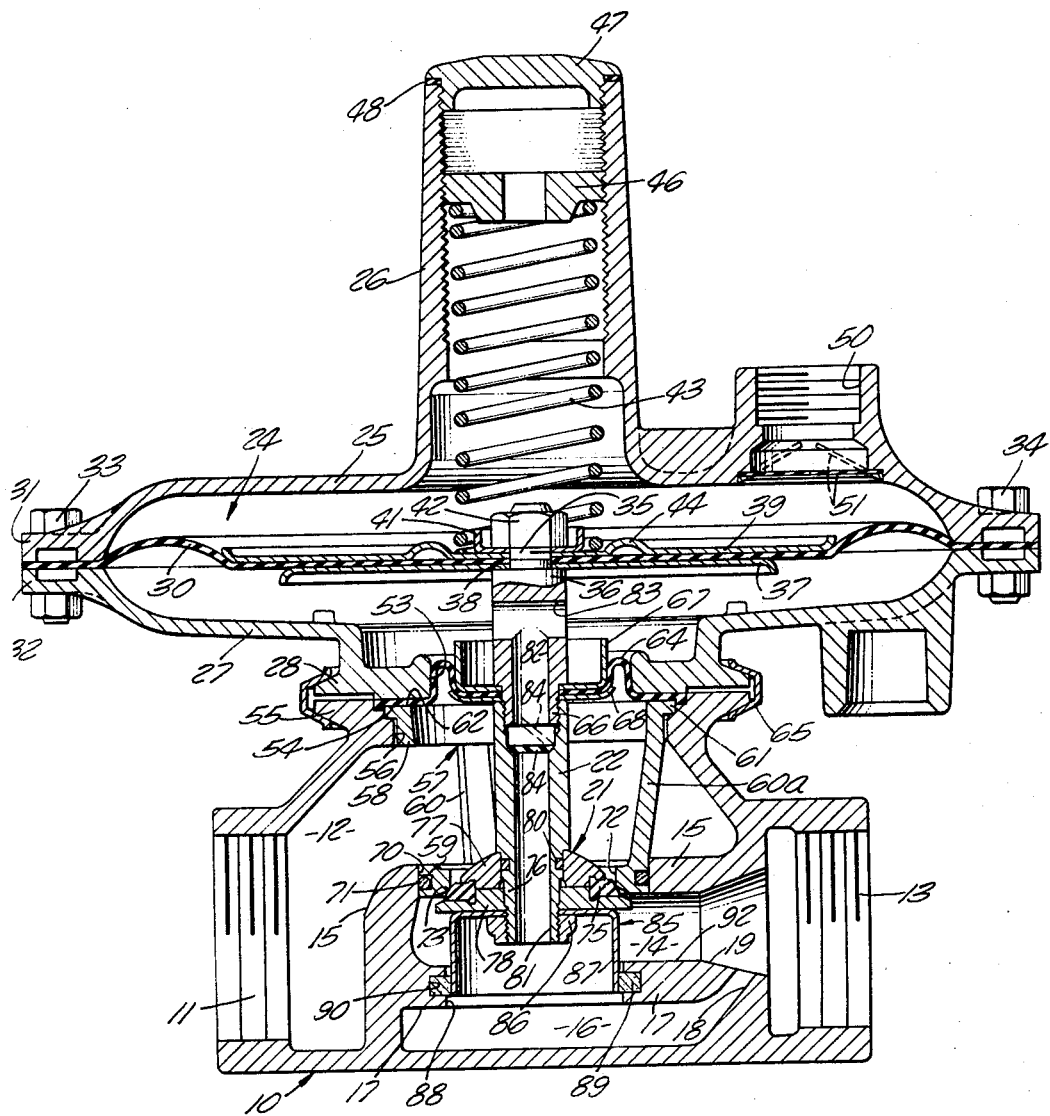

Donald R. Gneiding, Fullerton, and Robert Schwerter, Anaheim, Calif., assignors, by mesne assignments, to American Meter Company, Philadelphia, Pa., a corporation of Delaware
Filed Aug. 18, 1966, Ser. No. 573,300
10 Claims. (Cl. 137—484.6)

This invention relates to a pressure regulator and more particularly to an improved pressure regulator for regulating gas pressure and the like employing a balancing piston arrangement.

Typical gas pressure regulators include an inlet and an outlet having a valve disposed therebetween for regulating the gas pressure at the outlet over a range of gas flow. Primary and secondary diaphragms and a spring usually are provided for controlling the operation of the valve. Conventional regulators of this type are characterized by several operational problems. They have a tendency to compound excessively with large gas flow, that is, the outlet pressure tends to increase at higher gas velocities. Additionally, there is a large opening sag or delay in providing the desired outlet pressure.

The valves in conventional regulators of this type are inherently unbalanced and a constantly increasing force is required to cause the valve to move through its full stroke when opening. This occurs because as the valve opens the inlet pressure acting on the secondary diaphragm remains relatively constant while the pressure on the face of the opening valve diminishes. This characteristic, along with the loss of spring force with increasing valve stroke, causes a severe loss in outlet pressure as the valve is opened. Accordingly, compensation sometimes is provided by employing a siphon action, such as by a pitot tube provided at the outlet, to compensate for the force and pressure losses. This method of compensation is adequate when low volumes of gas are flowing. However, inasmuch as there is a nonliner relationship between siphon pressure and gas velocity, this method of compensation sometimes causes the valve to fall fully open when large volumes of gas are flowing. Thus, regulators of this nature usually are limited in terms of capacity and inlet pressure. The opening sag or delay problem is believed to be a result of the failure of the siphon action to take effect, e.g. increase sufficiently, until fairly high gas velocities are reached. As a result, there is a delay in opening until a sufficient gas velocity buildup is obtained. Additionally, there is an accompanying surge of outlet pressure as the siphon action takes effect.

Accordingly, it is an object of the present invention to provide an improved pressure regulator for gas and the like.

It is a further object of this invention to provide a pressure regulator having improved operating characteristics.

It is an additional object of the present invention to provide a pressure regulator including a balancing piston for affecting the pressure regulation thereof.

Another object of this invention is to provide a pressure regulator utilizing a balancing piston arrangement for providing improved operational characteristics and improved sensitivity in outlet pressure control.

These and other objects of the invention will become more apparent upon a consideration of the following description taken in conjunction with the drawing, the single figure of which is a cross-sectional illustration of a pressure regulator according to the present invention.

Turning now to the drawing, a pressure regulator according to the invention includes a valve body 10 having a threaded inlet 11 communicating with an inlet chamber 12 and a threaded outlet 13 communicating with an outlet expansion chamber 14. The inlet and outlet chambers 12 and 14 are separated by a wall 15. A siphon chamber 16 is separated from the outlet chamber 14 by a wall 17 but communicates through a slot 18 with a flared downstream end 19 of the outlet chamber 14. The chambers 14 and 16 may be, for example, essentially rectangular in cross section. A valve having a closure member 21 and a stem 22 is disposed within the valve body 10 between the inlet and outlet chambers, and will be discussed in greater detail subsequently.

A diaphragm chamber 24 is formed by an upper member 25 having an upstanding tubular spring housing 26, and a lower member 27 having a depending flanged end 28. The diaphragm chamber 24 is divided by a diaphragm 30 preferably made of synthetic rubber. The periphery of the diaphragm 30 is sealed between outer flanges 31 and 32 of the respective upper and lower members 25 and 27. The flanges 31 and 32 may be secured together by means of a plurality of screw fasteners, such as 33 and 34, spaced around the periphery thereof.

The diaphragm 30 has a central aperture and is mounted on a threaded end 35 of a valve stem extension 36 which is secured to the valve stem 22. A lower back-up plate 37 abuts a shoulder 38 on the extension 36, and the diaphragm 30 is secured between the plate 37 and an upper back-up plate 39. The back-up plates 37 and 39 and the diaphragm 30 are retained on the threaded end 35 of the extension 36 by a cup washer 41 and nut 42. The washer serves to retain the lower end of a compression spring 43 in position against the upper back-up plate 39. The plate 39 may include a circular rib 44 for stiffness. The spring 43 extends upwardly into the spring housing 26, and the upper end thereof abuts against a threaded spring seat member 46. The member 46 may be adjusted up or down for selecting the desired spring bias exerted against the upper back-up plate 39, and thus the bias on the diaphragm 30. A cap 47 is threaded into the upper end of the housing 26 and a gasket 48 provides a seal therebetween. A passageway 50 is provided through the upper member 25 and vents the upper portion of the diaphragm chamber 24 to the atmosphere. A rubber flapper 51 may be provided within the passageway 50 for dampening purposes.

The flanged end 28 of the lower member 27 has a bore 53 therethrough and a lower face 54. The valve body 10 includes an upper flanged end 55 having a stepped bore 56 therethrough. A member 57 having an upper ring portion 58 and a lower ring portion 59 joined by a plurality of peripherally spaced ribs, only ribs 60 and 60a being seen in the drawing, is mounted in the valve body 10. The upper ring portion 58 includes a flange 61, which abuts a shoulder in the stepped bore 56, and an upper face 62. A secondary diaphragm 64 preferably of synthetic rubber is positioned between the flanged ends 28 and 55, and the periphery of this diaphragm is sealed between the lower face 54 of the end 28 and the upper face 62 of the ring portion 58. The flanged ends 28 and 55 are secured together by a split clamp ring 65.

The lower end 66 of the valve stem extension 36 is threaded into the upper end of the valve stem 22. The lower end 66 includes a shoulder against which a cupped upper back-up plate 67 abuts, with the secondary diaphragm 64 being mounted between the back-up plate 67 and a lower back-up plate 68. The lower ring portion 59 of the member 57 is seated within a bore 70 in the wall 15 of the valve body 10, and a seal is provided by an O-ring 71. A bore 72 is provided through the lower ring portion 59 thereby providing a valve seat 73. The valve closure member 21 includes an annular resilient ring 75 retained on the lower end 76 of the valve stem 22 by washers 77 and 78. The ring 75 preferably is formed of synthetic rubber, such as sold under the trade names of Buna N or Viton. The upper washer 72 has a spherical face exposed to the inlet chamber 12 and is sealed with the lower end 76 of the valve stem 22 by a gasket 80. The lower washer 78 is flanged to provide backup for the ring 75, and both the washers 77 and 78 may include circular grooves to aid in retaining the ring 75 and providing a good seal. A bore 81 is provided through the stem 22 and communicates through bores 82 and 83 in the stem extension 36 with the lower portion of the diaphragm chamber 24 at the underside of the diaphragm 30. A rubber flapper 84 may be provided in the bore 81 for dampening purposes.

According to a principal feature of the present invention, a balancing piston 85 is coupled with the lower end of the valve stem 22 and serves to provide a balancing action for the valve. The balancing piston 85 is retained on the lower end 76 of the valve stem 22 in abutment with the lower face of the washer 78 by means of a nut 86. The piston 85 includes a skirt 87 which extends through a bore 88 in the wall 17 of the valve body 10 and thus separates the output and siphon chambers. The periphery of the skirt 87 engages a sealing ring 89 retained in a groove 90 in the wall 17. The exterior of the piston 85 preferably is nickel plated to reduce friction. The sealing ring 89 preferably is formed of a porous felt material, such as Spanish hard felt which is all wool. This arrangement provides an imperfect seal between the periphery of the skirt 87 of the piston 85 and the sealing ring 89 thereby creating a variable restriction or variable orifice between the outlet and siphon chambers. This results because gas can flow through the sealing ring 89 itself, and also between the ring and the periphery of the skirt 87 as increasing gas velocity passing from the inlet to outlet chambers tends to push the piston 85 off center in the direction of gas flow, e.g. toward the right as shown in the drawing.

In use, the threaded inlet of the valve body 10 is coupled to a gas supply line, and the threaded outlet 13 is coupled with a discharge line leading to, for example, gas burners. Assuming that there is no demand downstream of the outlet 13, the resilient ring 75 of the valve closure member 21 abuts the valve seat 73. This occurs because the outlet pressure rises until the valve member 21 closes against the seat, and this pressure is applied through the bores 81 through 83 to the underside of the diaphragm 30 thereby upsetting the force balance across the diaphragm 30 since the pressure on the underside is greater than the force exerted by the spring 43. When there is a demand downstream of the outlet 13, the valve member 21 opens because of the reduction in pressure on the underside of the diaphragm 30. In a conventional valve, the force of the spring 43 decreases as the valve opens further, and the effective valve face area decreases. In a regulator constructed in accordance with the teachings of the present invention, the valve is balanced throughout its stroke through the use of a relatively high outlet chamber 14 pressure which exerts an increasing downward force on the balancing piston 85 thereby compensating for the decreasing downward force on the valve. As noted previously, an imperfect seal is formed between the chamber 14 and siphon chamber 16 by the piston 85 and sealing ring 89. With this arrangement, it is not necessary to use the typical severe siphon action to overcome an imbalance in the valve. Thus, a moderate siphon action is provided by the siphon chamber 16 and slot 18 to compensate for the loss of opening force as a result of spring extension, and to compensate for the reduction in differential pressure across the valve as it strokes open. This moderate siphon action also is relatively linear throughout a large gas flow range, and the danger of the siphon effect causing the regulator to become unbalanced and fall open at large gas flow velocities is significantly reduced. Furthermore, this action of the outlet expansion chamber pressure in exerting a downward force against the outside of the balancing piston 85 aids in opening the valve and reduces the sag or delay in initial openings thereof inasmuch as this force becomes available as soon as gas begins to flow through the valve.

In addition to the advantages and features enumerated above, the balancing piston arrangement also provides greater sensitivity similar to that provided by increasing the area of the primary diaphragm 30. This effect is greater than is achieved by simply increasing the primary diaphragm area an amount equal to the area of the balancing piston because of the greater pressure differential which exists across the balancing piston between the expansion and siphon chambers as opposed to that which exists across the primary diaphragm.

The valve body 10 may be formed by casting on a shell core, and the angle of the lower side of the flared downstream end 19 with respect to the lower side of the upstream end 92 of the expansion chamber 14 may be selected to provide the desired degree of siphoning action. The siphoning action may be decreased by forming the lower side 19 to be more nearly along the same plane as the lower side 92, or even to form a positive angle (lower side 19 extending upwardly as seen in the drawing) with respect to the lower side 92. Also the size of the slot 18 may be selected for affecting the siphon action.

The present embodiment of the invention is to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:
1. In a pressure regulator employing diaphragm means responsive to a pressure differential for affecting the operation of a valve, the combination comprising
   a valve body having an inlet adapted to be coupled with a gas supply line and an outlet at which gas pressure is to be regulated, said valve body including an inlet chamber communicating with said inlet, an outlet chamber communicating with said outlet, and a siphon chamber communicating with said outlet chamber, an opening between said outlet and siphon chambers,
   valve means disposed between said inlet and outlet chambers for controlling the gas flow through said valve means from said inlet chamber to said outlet chamber, said valve means comprising a valve seat within said valve body and valve closure means for controlling the gas flow past said valve seat between said inlet and outlet chambers, and
   piston means coupled with said valve closure means and extending into said opening between said outlet and siphon chambers, and sealing means in said opening engaging said piston means for providing a variable restriction between said outlet and siphon chambers.
2. Apparatus as in claim 1 wherein
   at least a portion of said piston means is disposed directly in the flow path between said inlet and outlet chambers.
3. Apparatus as in claim 1 wherein
   said piston means includes skirt means extending into said opening between said outlet and siphon chambers, and said sealing means is formed of a porous material which engages said opening and the periphery of said skirt portion.
4. Apparatus as in claim 3 wherein
   said valve body includes an interior wall defining said outlet and siphon chambers, and said opening therebetween is cylindrical,
   said sealing means is formed of a felt material and is mounted in a groove in said wall and extends into said opening.

5. In a pressure regulator employing diaphragm means responsive to a pressure differential for affecting the operation of a valve, the combination comprising a valve body having an inlet adapted to be coupled with a supply line and an outlet at which pressure is to be regulated, said valve body including a first wall defining an inlet chamber and an outlet chamber, said inlet chamber communicating with said inlet and said outlet chamber communicating with said outlet, and said body having a second wall defining a siphon chamber communicating with said outlet chamber and having an opening therein between said outlet and siphon chambers, valve means disposed between said inlet and outlet chambers for controlling the gas flow through said valve means from said inlet chamber to said outlet chamber, said valve means comprising a valve seat in said first wall and valve closure means for controlling the gas flow past said valve seat from said inlet chamber to said outlet chamber, and piston means coupled with said valve closure means and extending into said opening in said second wall, and sealing means in said opening engaging said second wall and said piston means for providing a variable restriction between said outlet and siphon chambers, said piston means serving to balance the operation of said valve closure means by the pressure differential acting thereon between said outlet and siphon chambers.

6. Apparatus as in claim 5 wherein
said piston means includes skirt means extending into said opening in said second wall, and said sealing means is mounted in said second wall at the opening therein and engages the periphery of said skirt portion of said piston means.

7. Apparatus as in claim 6 wherein
said sealing means is formed of a felt material.

8. A pressure regulator having an inlet for receiving gas and an outlet at which gas pressure is controlled comprising diaphragm chamber means having a first diaphragm mounted therein, a valve body having an inlet adapted to be coupled with a gas supply line and an outlet at which gas pressure is to be regulated, said valve body including an inlet chamber communicating with said inlet, an outlet chamber communicating with said outlet, and a wall separating said outlet chamber from a siphon chamber, said wall having an opening therein between said outlet and siphon chambers and a passageway communicating said siphon chamber with said outlet chamber, a portion of said valve body having an aperture therein, a second diaphragm coupled between said portion of said valve body and said diaphragm chamber means, a side of said second diaphragm being responsive to inlet chamber pressure, valve means disposed between said inlet and outlet chambers for controlling the gas flow through said valve means from said inlet chamber to said outlet chamber, said valve means comprising a valve seat within said valve body and valve closure means coupled with said diaphragms and responsive thereto for controlling the gas flow past said valve seat between said inlet and outlet chambers, said valve closure means having an aperture therein communicating from said siphon chamber to said diaphragm chamber means between said first and second diaphragms, and piston means coupled with said valve closure means and extending into said opening between said outlet and siphon chambers, and sealing means extending into said opening and engaging said piston means and said wall for providing a variable restriction between said outlet and siphon chambers, said piston means serving to balance the operation of said valve closure means by the pressure differential acting thereon between said outlet and siphon chambers.

9. A pressure regulator as in claim 8 wherein
said piston means includes skirt means extending into said opening between said outlet and siphon chambers, and said sealing means is supported by said wall and engages the periphery of said skirt portion of said piston means.

10. Apparatus as in claim 9 wherein said sealing means is formed of a porous material.

References Cited

UNITED STATES PATENTS 553,851  2/1896  Hardie _____ 137—505.26 XR

FOREIGN PATENTS 930,795  7/1963  Great Britain.

WILLIAM F. O'DEA, *Primary Examiner.*

W. WEAKLEY, *Assistant Examiner.*